Oct. 11, 1932.  C. F. RAISCH  1,881,945

CENTRALIZED LUBRICATING SYSTEM

Filed Aug. 26, 1929

Inventor
Charles F. Raisch
By Williams Bradbury
McCaleb & Hinkle
Attys

Patented Oct. 11, 1932

1,881,945

UNITED STATES PATENT OFFICE

CHARLES F. RAISCH, OF CHICAGO, ILLINOIS, ASSIGNOR TO ALEMITE CORPORATION, OF CHICAGO, ILLINOIS, A CORPORATION OF DELAWARE

CENTRALIZED LUBRICATING SYSTEM

Application filed August 26, 1929. Serial No. 388,333.

My invention relates, generally, to centralized lubricating systems for automotive chassis lubrication and more particularly to an improved means for lubricating the king pin front axle bearings.

Due to the relative movement of the parts, the restricted space available, and the limitations imposed by the design of the front axle steering knuckle bearings, it has been a considerable problem to supply lubricant to these bearings with any degree of assurance that the bearings will receive the proper amount of lubricant. It is thus an object of my invention to provide an improved means for conducting the lubricant to the upper and lower king pin bearings which would assure adequate supply of lubricant to both of these bearings.

A further object is to provide an improved method of lubricating the king pin bearings which does not necessitate major alterations in the design of the parts and which may thus readily be adapted to any automotive vehicle.

Figure 1:
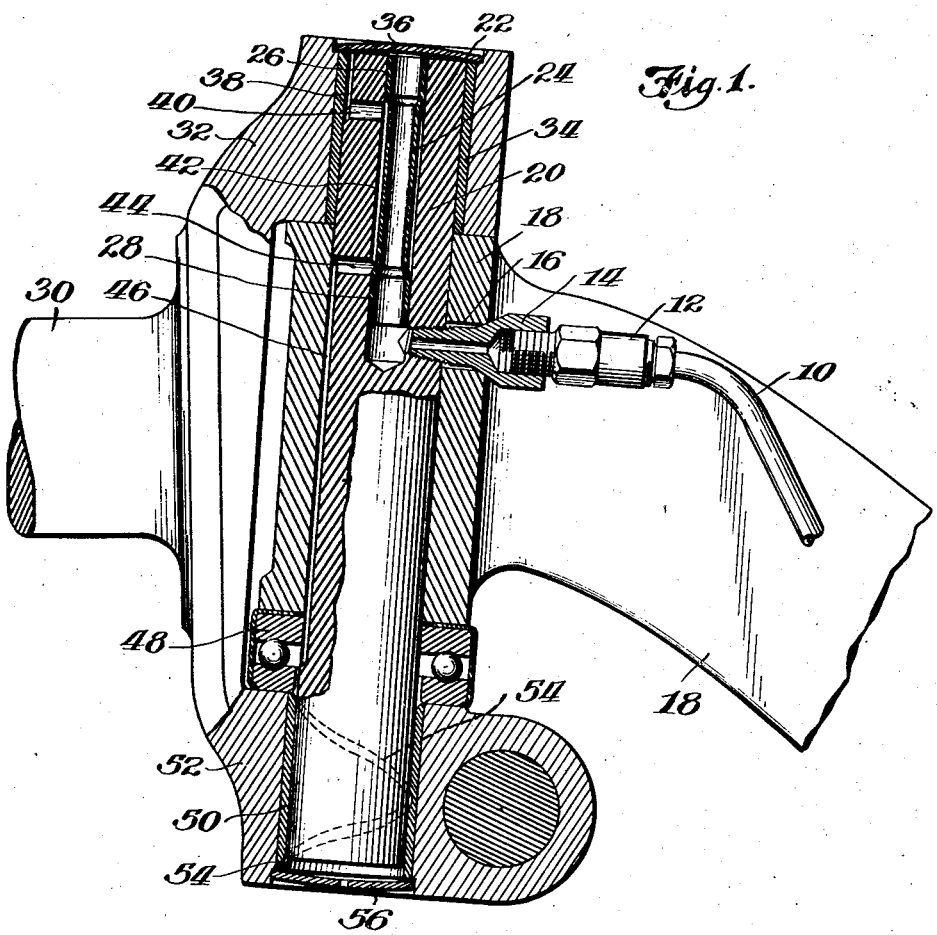
Figure 2:
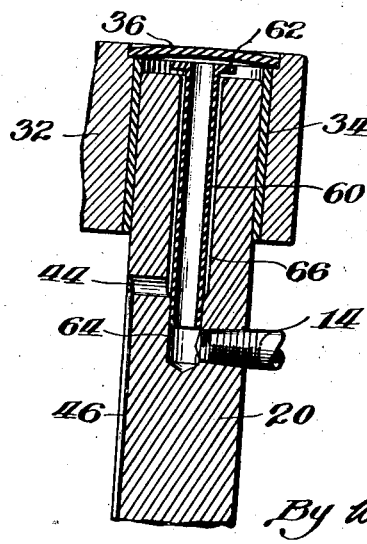

Other objects will appear from the following description, reference being had to the accompanying drawing in which Figure 1 is a central vertical section of the front axle steering knuckle bearing assembly; and Figure 2 is a similar view of the upper king pin bearing incorporating a modified form of my invention.

In the method of lubricating the king pin bearings according to my preferred invention shown in Figure 1, lubricant is supplied to the bearing through a conduit 10 and a flow resistance unit 12 which may be of any well known construction, such, for example, as shown in my co-pending application, Serial No. 388,332 filed herewith. The resistance unit 12 is threaded in a nipple 14 which passes through a suitable opening 16 formed in the axle 18 and is threaded in a king pin 20 which, as is customary, is rigidly secured to the axle 18.

The upper end of the king pin is axially drilled at 22, the lower end of the drill hole being in communication with the bore through the nipple 14. A tube 24, having its upper end 26 and its lower end 28 of slightly increased diameter, is driven into the drill hole 22 and the parts are so dimensioned that the enlarged portions 26 and 28 of the tube will tightly press against the walls of the drill hole 22 and form lubricant-tight seals.

The spindle 30 has an upper yoke portion 32 which is suitably bored to receive a bushing 34. The upper end of the bore in the portion 32 is preferably closed by a disc 36 which is initially concavo-convex and will securely wedge itself in place upon being struck a blow at its central dome portion. The upper end of the king pin 20 has a short longitudinal passageway 38 which communicates with a radial passageway 40. The passageway 40 terminates in a tubular duct 42 which is formed between the reduced portion of the tube 24 and the walls of the drill hole 22. The lower end of this tubular duct 42 communicates with a radial passageway 44, the outer end of which connects with a longitudinal groove 46. The groove 46 leads to a ball thrust bearing assembly 48 from which the oil may flow to lubricate the lower end of the king pin which bears in a bushing 50 pressed in the lower yoke portion 52 of the spindle. The bushing 50 preferably has a helical oil groove 54 cut therein to distribute the oil over the surface of the bearing and to permit surplus oil to drain therefrom. The lower end of the bore in the portion 52 is closed against the admission of dirt and dust by an apertured disc 56 which is secured in place in the same manner as the disc 36, the aperture in the disc permitting drainage of surplus oil.

The lubricant supplied through the conduit 10 feeds through the resistance unit 12, nipple 14 and thence upwardly through the tube 24 to the upper end surface of the king pin. Part of the oil thus supplied to the upper end of the king pin will flow into the upper king pin bearing and lubricate the surfaces between the bushing 34 and the king pin. The lubricant not required for the lubrication of this bearing will flow downwardly through the passageways 38 and 40 to the tubular duct 42, passageway 44 and groove 46 to the ball thrust bearing assembly 48 which will thus be supplied with an adequate quantity of lubricant. Lubricant will drain from the ball bearing assembly to the lower king pin bearing and adequately lubricate the surface between the lower end of the king pin and bushing 50. The surplus lubricant will collect in the groove 54 and drain from the bearing through the aperture in the disc 56.

In the modified form of my invention, shown in Figure 2, I have provided a different form of tube for assuring the flow of lubricant to the upper king pin bearing. The tube 60 shown in Figure 2 has an outwardly extending flange 62 at its upper end, the lower end of the tube being driven into the reduced portion 64 of a hole 66 axially drilled in the upper end of the king pin.

In this modified form lubricant will be supplied through the nipple 14 and will pass upwardly through the tube 60 and due to the flange 62 at the upper end thereof, will spread outwardly so as to provide sufficient lubricant for the upper king pin bearing. A portion of the lubricant will, however, flow downwardly through the tubular passageway formed between the outer wall of the tube 60 and the walls of the hole 66, and through the duct 44 and groove 46 pass to the thrust and lower king pin bearings in the same manner as above described with reference to the disclosure in Figure 1.

While the embodiments herein shown and described are admirably adapted to fulfill the objects primarily stated, it is to be understood that it is not intended to confine the invention to the forms of embodiment herein disclosed, for the invention is susceptible of embodiment in various forms all coming within the scope of the claims which follow.

I claim:

1. In a centralized lubricating system for the chassis bearings of an automotive vehicle, the combination of a king pin having upper and lower bearings and a longitudinally drilled hole in the upper end thereof, a tube having end portions of enlarged diameter engaging in and sealing against the walls of said hole, means for supplying lubricant to the lower end of said hole, and a lubricant passageway connecting the upper and lower king pin bearings, said passageway including a duct formed by the space between a portion of said tube and the walls of said hole.

2. Means for conducting lubricant to a plurality of related bearings comprising a pin forming one bearing part and about which the other bearing part is adapted to move, a longitudinal bore in said pin, means for supplying lubricant to the lower end of said bore, a tube having enlarged end portions fitting tightly in said bore, and passageways communicating with the respective ends of the space between the central portion of said tube and the walls of said bore for conducting lubricant from the bearing adjacent said end of said pin to the related bearing.

3. In a lubricating system, two bearings to be lubricated, a common shaft element rotatable in said bearings, a longitudinal bore at one end of said element means for supplying lubricant to the lower end of said bore, a tube having enlarged end portions fitting in said bore, and a pair of ducts in said shaft element communicating with the space between said tube and the walls of said bore at a point between the enlarged end portions of said tube and adapted to conduct lubricant from one of said bearings to the other.

4. In a centralized lubricating system for the chassis bearings of an automotive vehicle, the combination of a pin, a plurality of bearings therefor, a longitudinally drilled passageway in the upper end thereof, a tube having end portions of enlarged diameter engaging in and sealing against the walls of said passageway, means for supplying lubricant to the lower end of said passageway, and a lubricant passageway connecting said latter bearings, said passageway including a duct formed by the space between a portion of said tube and the walls of said first-mentioned passageway.

5. In a centralized lubricating system for the chassis bearings of an automotive vehicle, the combination of a king-pin having upper and lower bearings and a longitudinally drilled passageway in the upper end thereof, a tube having end portions of enlarged diameter engaging in and sealing against the walls of said passageway, means for supplying lubricant to the lower end of said passageway, and lubricant passageways connecting the upper and lower king-pin bearings, said passageways including a duct formed by the space between a portion of said tube and the walls of said first-mentioned passageway, a horizontal passageway to the outside wall of said king-pin, and a passageway along one side of the king-pin extending to the lower bearings.

6. In a lubricating system, a pair of bearings to be lubricated, a common shaft element rotatable in said bearings, a longitudinal bore in one end of said shaft element, means for supplying lubricant to said bore, a tube having an enlarged portion tightly fitting in said bore and a pair of oil passageways in said shaft element communicating with the space between said tube and the walls of said bore above said enlarged portion of said tube and adapted to conduct lubricant from one of said bearings to another.

7. In a lubricating system, an auxiliary distributing system comprising a shaft element rotatable in an upper and a lower bearing, said shaft element having a longitudinal bore in one end, means for supplying lubricant to the lower end of said bore, a tubular member having a reduced portion intermediate the ends thereof fitted in said bore, a pair of vertical oil passageways in said shaft communicating with said longitudinal bore opposite said reduced tube portion and a grooved passageway along an outside face of said shaft to conduct lubricant from one of said vertical oil passageways to said lower bearing.

In witness whereof, I hereunto subscribe my name this 19th day of August, 1929.

C. F. RAISCH.